US007423790B2

(12) United States Patent
Kochi et al.

(10) Patent No.: US 7,423,790 B2
(45) Date of Patent: Sep. 9, 2008

(54) PHOTOELECTRIC CONVERSION APPARATUS AND CONTACT-TYPE IMAGE SENSOR

(75) Inventors: Tetsunobu Kochi, Kanagawa-ken (JP); Kazuo Yamazaki, Kanagawa-ken (JP); Hiraku Kozuka, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 684 days.

(21) Appl. No.: 11/076,961

(22) Filed: Mar. 11, 2005

(65) Prior Publication Data

US 2005/0206763 A1    Sep. 22, 2005

(30) Foreign Application Priority Data

Mar. 18, 2004 (JP) ............................. 2004-078469
Mar. 18, 2004 (JP) ............................. 2004-078470

(51) Int. Cl.
    *H04N 1/46* (2006.01)
(52) U.S. Cl. .................. 358/513; 358/514; 358/482; 358/483; 382/312; 250/208.1; 348/294
(58) Field of Classification Search ................ 358/513, 358/514, 482, 483, 505, 474, 448, 475, 1.9; 382/312; 250/208.1; 348/294, 298, 311, 348/222.1; 257/222
    See application file for complete search history.

(56) References Cited

U.S. PATENT DOCUMENTS

| 4,620,236 | A | * | 10/1986 | Tanaka et al. ............... 358/475 |
| 5,844,695 | A | * | 12/1998 | Suzuki ......................... 358/475 |
| 5,990,503 | A | * | 11/1999 | Ingram et al. ................ 257/222 |
| 6,072,588 | A | * | 6/2000 | Dohnomae ................... 358/1.9 |

(Continued)

FOREIGN PATENT DOCUMENTS

JP    8-139852    5/1996

(Continued)

OTHER PUBLICATIONS

U.S. Appl. No. 09/161,294, Sep. 28, 1998.

(Continued)

*Primary Examiner*—Mark Zimmerman
*Assistant Examiner*—Henry Dahbour
(74) *Attorney, Agent, or Firm*—Fitzpatrick, Cella, Harper & Scinto

(57) ABSTRACT

To prevent such a situation that a signal from a pixel in a dark state is output at a level shifted from an originally set level to deteriorate an image quality, and to improve the image quality. A photoelectric conversion apparatus according to the present invention includes: a plurality of photoelectric conversion elements; a plurality of amplifying units for amplifying a signal in accordance with a photo-carrier generated in the photoelectric conversion elements; a plurality of signal holding units for holding output signals from the amplifying units through a plurality of switch units; and a control signal supplying unit for supplying a control signal to the switch units through a control line, in which the control line is sequentially connected to the plurality of switch units and has both ends connected to the control signal supplying units, or a change rate with time of an amplitude of a signal held by the signal holding units is set lower than a change rate with time of am amplitude of the control signal at the time of turning off the switch units.

13 Claims, 17 Drawing Sheets

U.S. PATENT DOCUMENTS

| | | | |
|---|---|---|---|
| 6,169,317 B1 | 1/2001 | Sawada et al. | 257/435 |
| 6,188,094 B1 | 2/2001 | Kochi et al. | 257/232 |
| 6,198,506 B1 * | 3/2001 | Nakata et al. | 348/222.1 |
| 6,239,883 B1 * | 5/2001 | Lam et al. | 358/475 |
| 6,303,951 B1 | 10/2001 | Sawada et al. | 257/292 |
| 6,473,538 B2 | 10/2002 | Kozuka | 382/312 |
| 6,605,850 B1 | 8/2003 | Kochi et al. | 357/431 |
| 6,608,299 B2 | 8/2003 | Kozuka | 250/214.1 |
| 6,670,990 B1 | 12/2003 | Kochi et al. | 348/310 |
| 6,717,151 B2 | 4/2004 | Tashiro et al. | 250/370.11 |
| 6,800,836 B2 | 10/2004 | Hamamoto et al. | 250/208.1 |
| 6,946,637 B2 | 9/2005 | Kochi et al. | 250/208.1 |
| 6,961,088 B2 | 11/2005 | Kameshima et al. | 348/303 |
| 7,110,030 B1 | 9/2006 | Kochi et al. | 348/308 |
| 7,221,397 B1 | 5/2007 | Kochi | 348/310 |
| 2001/0012133 A1 | 8/2001 | Yoneda et al. | 358/482 |
| 2005/0023438 A1 | 2/2005 | Hamamoto et al. | 250/208.1 |
| 2005/0035271 A1 | 2/2005 | Kochi et al. | 250/208.1 |
| 2005/0185074 A1 | 8/2005 | Yoneda et al. | 348/294 |
| 2006/0169871 A1 | 8/2006 | Kochi | 250/208.1 |

FOREIGN PATENT DOCUMENTS

| | | |
|---|---|---|
| JP | 11-234473 | 8/1999 |
| JP | 2003-069347 | 3/2003 |

OTHER PUBLICATIONS

U.S. Appl. No. 09/264,719, Mar. 9, 1999.
U.S. Appl. No. 11/275,675, Jan. 24, 2006.

* cited by examiner

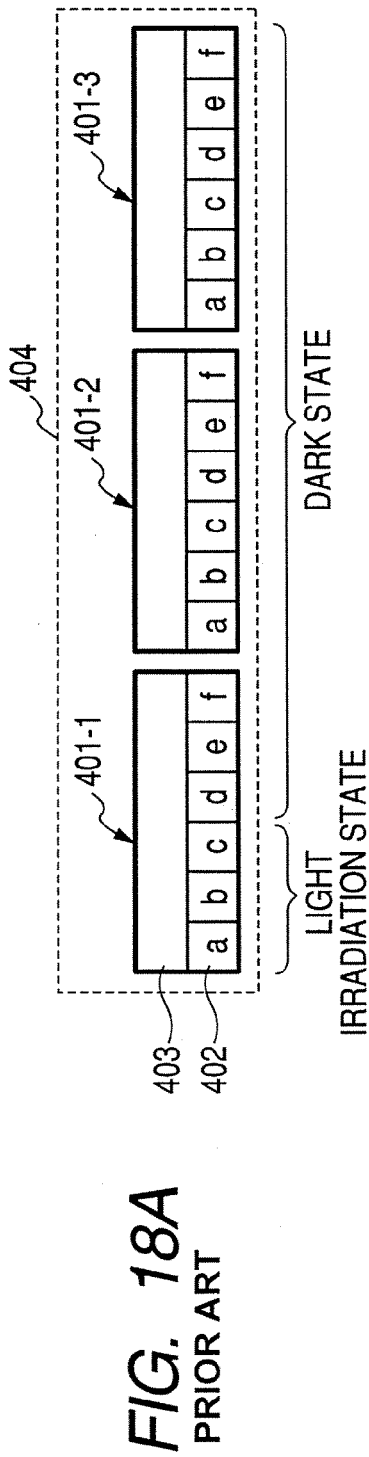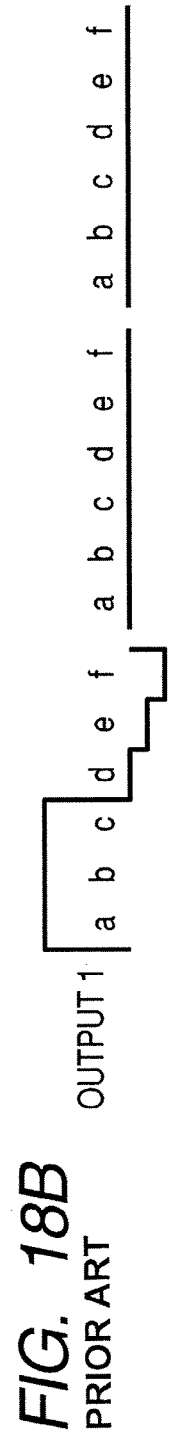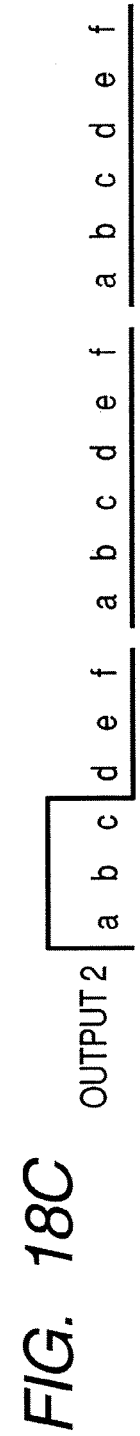
FIG. 18A PRIOR ART
FIG. 18B PRIOR ART
FIG. 18C

PHOTOELECTRIC CONVERSION APPARATUS AND CONTACT-TYPE IMAGE SENSOR

BACKGROUND OF THE INVENTION

1. Field of the Invention

The present invention relates to a photoelectric conversion apparatus having a photoelectric conversion element and a capacitor element for holding a signal, a contact-type image sensor, and an original image reading apparatus. The contact-type image sensor uses plural photoelectric conversion apparatuses mounted thereto to read an original image by receiving light reflected by an original surface to be read.

2. Related Background Art

FIG. 14 is a schematic diagram of a conventional photoelectric conversion apparatus.

In FIG. 14, a circuit of a 6-pixel linear sensor is shown as an example. The respective pixels are arranged in line. Reference numeral 1 denotes a photoelectric conversion element such as a photodiode; a hole storage type photodiode is used by way of example herein (note that the photoelectric conversion element 1 is assigned with sub-numbers like 1-1, 1-2, . . . for each pixel; the same applies to other elements in the following description). Reference numeral 2 denotes a first reset MOS transistor; 3, an input MOS transistor of a first source follower; and 4, a constant current source of the first source follower. The input MOS transistor 3 and the constant current source 4 constitute a first source follower 5. In FIG. 14, a source follower configured by a PMOS transistor is shown by way of example. Reference numeral 6 denotes a first transfer MOS transistor (an NMOS transistor is used herein as an example); 7, a first storage capacitor; 8, an input MOS transistor of a second source follower; and 9, a constant current source of the second source follower. The input MOS transistor 8 and the constant current source 9 constitute a second source follower 10. In FIG. 14, a source follower configured by a PMOS transistor is shown by way of example. Reference numeral 11 denotes a second transfer MOS transistor; 12, a second storage capacitor; 13, a third transfer MOS transistor; 14, a third storage capacitor; 15, a scanning circuit; 16, a fourth transfer MOS transistor driven with a signal from the scanning circuit 15; 17, a common output line commonly connected with one terminal of the fourth transfer MOS transistor 16; 18, a differential-input output amplifier connected with the common output line 17; 19, a second reset MOS transistor for resetting the common output line 17; 20, a logic circuit for generating a pulse for controlling an operation of each of the reset MOS transistors and transfer MOS transistors; 21, a first reset power source; and 22, a second reset power source.

FIG. 15 shows an operational timing of the circuit.

Referring to FIG. 15, a circuit operation is described in brief. Reference symbol PRES denotes a reset pulse input to a gate of the reset MOS transistor 2; PCM, a first transfer pulse input to a gate of the first transfer MOS transistor; PTN, a second transfer pulse input to a gate of the second transfer MOS transistor 11; PTS, a third transfer pulse input to a gate of the third transfer MOS transistor 13; $SR_1$ to $SR_6$, scanning pulses sequentially output from the scanning circuit 15; and PRES2, a second reset pulse input to a gate of the second reset MOS transistor 19. Reference symbol $VSF_1$ denotes an output terminal potential of the first source follower 5; VM, a potential of the first storage capacitor 7; VN, a potential of the second storage capacitor 12; VS, a potential of the third storage capacitor 14; and VOUT, an output terminal potential of the output amplifier 18.

First, the first reset MOS transistor 2 is turned on in response to the reset pulse "PRES" at time $t_0$, thereby resetting the photoelectric conversion element 1. After that, the first transfer MOS transistor 6 is turned on in response to the first transfer pulse "PCM" at time $t_1$, thereby transferring the reset voltage to the first storage capacitor 7 through the first source follower 5. The first transfer MOS transistor 6 is turned off at time $t_2$ to hold the reset voltage in the first storage capacitor 7. The photoelectric conversion element 1 starts an operation of accumulating optical signals to generate signal charges in accordance with an incident light amount. The generated signal charges are converted into a signal voltage with a capacitor (not shown) provided in a position where the photoelectric conversion element 1 and the first input MOS transistor 3 are connected with each other.

In general, the capacitance corresponds to a junction capacitance of a photodiode, a drain junction capacitance of the reset MOS transistor, a gate capacitance of the input MOS transistor, and an inter-connection-wiring capacitance. Alternatively, the capacitance may be an intentionally added one. The second transfer MOS transistor 11 is turned on in response to the second transfer pulse "PTN" at time $t_3$, transferring the reset voltage across the storage capacitor 7 through the second source follower 10 to the second storage capacitor 12. The second transfer MOS transistor 11 is turned off at time $t_4$ to hold the reset voltage in the second storage capacitor 12.

Next, the first transfer MOS transistor 6 is turned on again in response to the first transfer pulse "PCM" at time $t_5$ that is an end time of accumulation operation, transferring the signal voltage through the first source follower 5 to the first storage capacitor 7. The first transfer MOS transistor 6 is turned off at time $t_6$ to hold the signal voltage in the storage capacitor 7. Following this, the third transfer pulse "PTS" is input at time $t_7$ to turn the third transfer MOS transistor 13 on, transferring the signal voltage across the first storage capacitor 7 to the third storage capacitor 14. The third transfer MOS transistor 13 is turned off at time $t_8$ to hold the signal voltage in the third storage capacitor 14. The photoelectric conversion element 1 is reset again by turning the first reset switch on in response to the reset pulse "PRES" at time $t_9$ and then starts accumulating optical signals in the next field. In parallel therewith, the common output line is reset in response to turn-on of the second reset pulse "$PRES_2$". After this reset, the fourth transfer MOS transistor 16 is turned on in response to the scanning pulse $SR_1$ to read the reset voltage and the signal voltage across the storage capacitors 12 and 14 to the common output line 17. A voltage difference between the two voltages is output as "VOUT" through the output amplifier 18 of the differential input.

Hereinafter, the reset pulse "$PRES_2$" and the scanning pulses "$SR_2$" to "$SR_6$" are sequentially turned on to sequentially read signals of the 6-pixel linear sensor. Using the read circuit as in this example makes it possible to perform the optical signal accumulating operation in the photoelectric conversion element portion concurrently with the signal reading operation. Therefore, a high-speed operation is realized.

FIGS. 16A to 16C schematically show the peripheral of the first transfer MOS transistor 6 of FIG. 14.

In FIGS. 16A to 16C, the same members as those in FIG. 14 are denoted by like reference symbols. FIG. 16A shows a case where all the transfer MOS transistors are turned on, FIG. 16B shows a case where some of the transfer MOS transistors are turned on, and FIG. 16C shows a case where all the transfer MOS transistors are turned off. Reference numeral 301 denotes a gate of the transfer MOS transistor 6; 302, a source of the transfer MOS transistor 6; 303, a drain of the transfer MOS transistor 6; and 304, a channel region formed below the gate 301 through a gate insulating film with the transfer MOS transistor 6 is turned on. A well region underlies the channel region 304. Reference numeral 305 denotes a capacitor between the gate 301 and the source 302; 306, a capacitor between the gate 301 and the drain 303; 307, a capacitor formed between the gate 301 and the channel 304 when the transfer MOS transistor 6 is turned on; 308, a capacitor formed between the gate and the well when the transfer MOS transistor 6 is turned off; 309, a resistance component added between the source follower 5 and the storage capacitor 7; 310, a control line for driving the gate of the first transfer MOS transistor 6; and 311, a resistance component involved in the control line which is schematically shown. The resistance component 309 corresponds to an internal resistance of the source follower and a channel resistance of the first transfer MOS transistor 6. Also, the resistance component 311 corresponds to a wiring resistance of the control line.

The capacitance involved in the control line corresponds to the capacitors 305, 306, and 307 when the transfer MOS transistor 6 is turned on as shown in FIG. 16A, and to the capacitors 305, 306, and 308 when the transistor is turned off as shown in FIG. 16C. The capacitor 308 is a series capacitor of a capacitor of the gate insulating film and a depletion layer capacitor of the well. Thus, its capacitance value is smaller than that of the capacitor 307. Thus, the capacitance involved in the control line takes a larger value when the transfer MOS transistor 6 is turned on than a value when the transistor is turned off.

Here, the operation of the transfer MOS transistor 6 at time $t_2$ in FIG. 15 will be discussed in more detail. As shown in FIG. 16A, when the gate voltage level is high, all the transfer MOS transistors 6 are turned on, so the capacitors 305, 306, and 307 of all the transfer MOS transistors 6 function as loads on the control line. Then, when the gate voltage gradually lowers in the course of the off-operation starting form the time $t_2$ down to a voltage whose difference from the source voltage approximates to a threshold voltage, the transfer MOS transistor 6 is turned off. Thus, as shown in FIG. 16C, the capacitance involved in the control line is reduced as mentioned above. At the time $t_2$, the photoelectric conversion element has just been reset, so the source of all the transfer MOS transistors 6 reaches a potential substantially corresponding to a reset voltage. As a consequence, all the transfer MOS transistors 6 are switched from an on-state to an off-state at substantially the same timing.

Next, FIGS. 17A and 17B are detailed charts showing timings of the operation at the time $t_2$ of FIG. 15.

FIG. 17A shows a gate voltage change with time of the transfer MOS transistor 6. In FIG. 17A, during a $T_1$ period, the large capacitance is involved in the control line, so a gate voltage gradient is gentle as shown in FIG. 17A due to an RC time constant resulting from the resistor 311 and the capacitor of the control line. When the gate voltage is gradually lowered to turn the transfer MOS transistor 6 off as mentioned above, the capacitance involved in the control line is reduced, with the result that the gate voltage changes abruptly (see a period $T_3$). FIG. 17B shows a change of the potential "VM" across the first storage capacitor 7 connected to the transfer MOS transistor 6. The first storage capacitor 7 and the control line 310 are coupled with the capacitors 305, 306, and 307 as shown in FIG. 16A. If the resistance with the source follower 5 is small enough, the voltage across the storage capacitor 7 can be fixed to the output voltage of the source follower. In practice, there is the resistance component 309, so the potential of the storage capacitor is transitionally changed in accordance with a change of the potential of the control line. The transitional change in potential is fixed when the transfer MOS transistor 6 is turned off. This change corresponds to a shift from a voltage to be basically read and output to the storage capacitor 7.

As shown in FIG. 17B, the voltage across the storage capacitor 7 is changed in accordance with how much the gate voltage is changed during the period $T_1$. The transfer MOS transistor is turned off during the period $T_3$ to thereby fix the transient potential change caused when in on-state. In addition, the storage capacitor 7 stays coupled with the control line through the capacitor 306, whereby the potential of the storage capacitor 7 changes.

Referring to FIGS. 17C and 17D, the operation at time $t_6$ of FIG. 15 is more detailed. At this time, the photoelectric conversion elements 1-1 to 1-3 of FIG. 14 receive irradiated light, and the elements 1-4 to 1-6 are in a dark state. With that proviso, all the transfer MOS transistors 6 are turned on during the period $T_1$ of FIG. 17C, so the gate voltage is changed at the same change rate as that in the period $T_1$ of FIG. 17A. Similarly, the voltage across the storage capacitor 7 is changed as shown in FIG. 17D in the same way. Next, description is directed to the period $T_2$. The output voltage from the source follower 5 in pixels connected to the photoelectric conversion element irradiated with light is higher than that of the pixels in a dark state. Thus, the transfer MOS transistors 6-1 to 6-3 of the irradiated pixels are first turned off. FIG. 16B shows a state during the period $T_2$ in which three of the six pixels are turned off and the remaining three are turned on. As apparent from FIG. 16B, the capacitance involved in the control line corresponds to a capacitance value between the period $T_1$ and the period $T_3$. Hence, the voltage of the control line changes with the angle of gradient intermediate between that of the period $T_1$ and that of the period $T_3$. Therefore, as shown in FIG. 17D, the potential change rate of the storage capacitor 7 in each pixel in a dark state is different from that of FIG. 17B depending on the potential change rate in the period T2.

Here, the pixels connected with the photoelectric conversion elements 1-4 to 1-6 have not been irradiated with light, so the potentials of the storage capacitor 7 are supposed to be the same at the time $t_2$ and the time $t_6$ and the output of the differential output amplifier 18 is 0. However, as mentioned above, there is a difference in potential of the storage capacitor 7 between the time $t_2$ and the time $t_6$ depending on the amount of light applied to the other photoelectric conversion elements 1-1 to 1-3. As a result, the output amplifier 18 of FIG. 14 will output a signal of a negative value. Thus, the signal whose level is lower than a level originally preset for a dark state is output, whereby a corresponding portion on the image is displayed in black beyond expectations, leading to a deteriorated image quality.

FIGS. 18A to 18C schematically show the above-mentioned contact-type image sensor configured by mounting the plural photoelectric conversion apparatuses thereto.

The contact-type image sensor is disclosed in, for example, Japanese Patent Application Laid-Open No. H11-234473. In FIG. 18A, reference numeral 401 denotes individual photoelectric conversion apparatuses; 402, a photoelectric conversion element; and 403, a peripheral processing circuit part in the photoelectric conversion apparatus. In FIG. 18A, the contact-type image sensor 404 including three photoelectric conversion apparatuses having 6 pixels is shown by way of example. FIG. 18B shown below FIG. 18A is a chart illustrative of a conventional photoelectric conversion apparatus with an output from the photoelectric conversion apparatus represented by the vertical axis, and spatial arrangement of corresponding pixels represented by the horizontal axis.

Here, consider the case in which preceding three pixels of the photoelectric conversion apparatus 401-1 are irradiated with light, and the rest are brought into a dark state. The preceding three pixels "a" to "c" of the photoelectric conversion apparatus 401-1 output signals corresponding to an irradiated light amount. The remaining three pixels "d" to "f" output signals of a negative value that becomes larger in the order of "d", "e", and "f" owing to a potential change of the storage capacitor as mentioned above. However, the photoelectric conversion apparatuses 401-2 and 401-3 have not received irradiated light at every pixel thereof, so such signals of a negative value are not output. Accordingly, it is necessary to output signals corresponding to the dark state from the sixth pixel "f" of the photoelectric conversion apparatus 401-1 and the first pixel "a" of the photoelectric conversion apparatus 401-2. Howbeit, one of them outputs the signal of a large negative value, so the boundary therebetween is recognized as a step, leading to a much larger deterioration in image quality than that with a single photoelectric conversion apparatus.

SUMMARY OF THE INVENTION

It is therefore an object of the present invention to prevent such a situation that a signal from a pixel in a dark state is output at a level shifted from an originally set level to deteriorate an image quality, and to improve the image quality.

In order to attain the aforementioned object, according to one aspect of the present invention, a photoelectric conversion apparatus includes:

a plurality of photoelectric conversion elements;

a plurality of amplifying means for amplifying a signal in accordance with a photo-carrier generated in the photoelectric conversion elements;

a plurality of signal holding means for holding output signals from the amplifying means through a plurality of switch means; and control signal supplying means for supplying a control signal to the switch means through a control line, in which the control line is sequentially connected to the plurality of switch means and has both ends connected to the control signal supplying means.

Further, according to another aspect of the present invention, a photoelectric conversion apparatus includes:

a plurality of photoelectric conversion elements;

a plurality of amplifying means for amplifying a signal in accordance with a photo-carrier generated in the photoelectric conversion elements;

a plurality of signal holding means for holding output signals from the amplifying means through a plurality of switch means; and control signal supplying means for supplying a control signal to the switch means through a control line, in which the control line is sequentially connected to the plurality of switch means and is connected to the control signal supplying means at its both ends and at least one position between the plurality of switch means.

Further, according to another aspect of the present invention, a photoelectric conversion apparatus includes:

a plurality of photoelectric conversion elements;

a plurality of amplifying means for amplifying a signal in accordance with a photo-carrier generated in the photoelectric conversion elements;

a plurality of signal holding means for holding output signals from the amplifying means through a plurality of switch means; and control signal supplying means for supplying a control signal to the switch means through a control line, in which the control line includes a plurality of separate control lines for the plurality of switch means that are divided into at least two groups, and connected sequentially to the plurality of switch means in each group, and the plurality of control lines are connected to the control signal supplying means.

Further, according to another aspect of the present invention, a photoelectric conversion apparatus includes:

a plurality of photoelectric conversion elements;

a plurality of amplifying means for amplifying a signal in accordance with a photo-carrier generated in the photoelectric conversion elements;

a plurality of signal holding means for holding output signals from the amplifying means through a plurality of switch means; and control signal supplying means for supplying a control signal to the switch means through a control line, in which the plurality of switch means are connected with a first wiring layer and a second wiring layer, the first wiring layer is connected to all the plurality of switch means, and the second wiring layer is connected to the switch means at nodes fewer than the switch means.

Further, according to another aspect of the present invention, a photoelectric conversion apparatus includes:

a plurality of photoelectric conversion elements;

a plurality of amplifying means for amplifying a signal in accordance with a photo-carrier generated in the photoelectric conversion elements;

a plurality of signal holding means for holding output signals from the amplifying means through a plurality of switch means; and control signal supplying means for supplying a control signal to the switch means through a control line, in which a change rate with time of an amplitude of a signal held by the signal holding means is set lower than a change rate with time of am amplitude of the control signal at the time of turning off the switch means.

According to the present invention, it is possible to reduce an influence of a change of an RC time constant of a control line in accordance with the number of pixels irradiated with light, and suppress a potential change of a signal storage capacitor. Accordingly, a photoelectric conversion apparatus can be attained, which can prevent such a situation that a signal from a pixel in a dark state is output at a level shifted from an originally set level to deteriorate an image quality, and to improve the image quality. In particular, this is effective for a contact-type image sensor having plural photoelectric conversion apparatuses mounted thereto.

BRIEF DESCRIPTION OF THE DRAWINGS

FIGS. 18A, 18B and 18C schematically show a contact-type image sensor configured by mounting plural photoelectric conversion apparatuses.

DESCRIPTION OF THE PREFERRED EMBODIMENTS

First Embodiment

Figure 1:
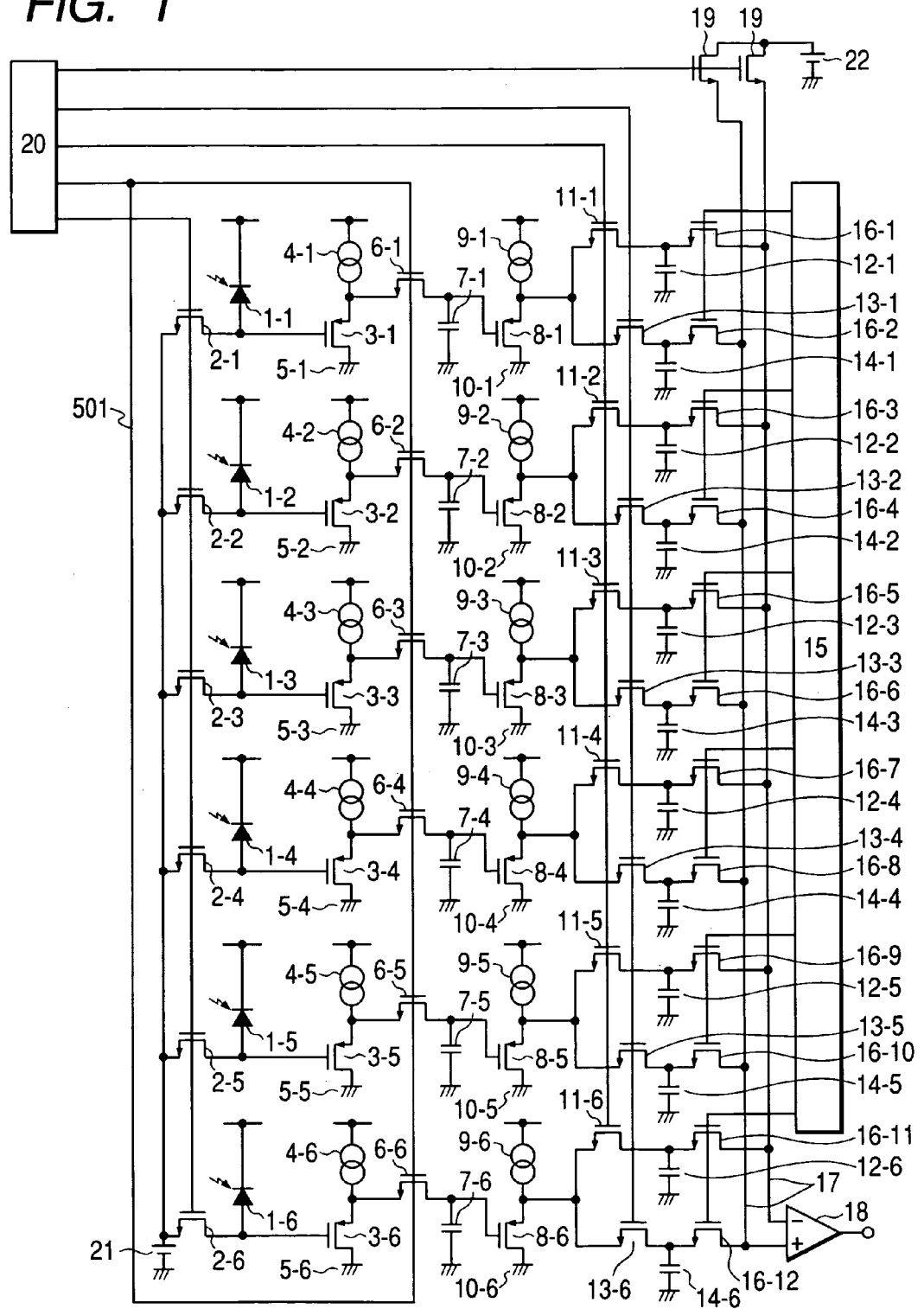
FIG. 1 is a schematic diagram showing a photoelectric conversion apparatus according to a first embodiment of the present invention.

FIG. 1 is a schematic diagram showing a photoelectric conversion apparatus according to a first embodiment of the present invention.

Figure 14:
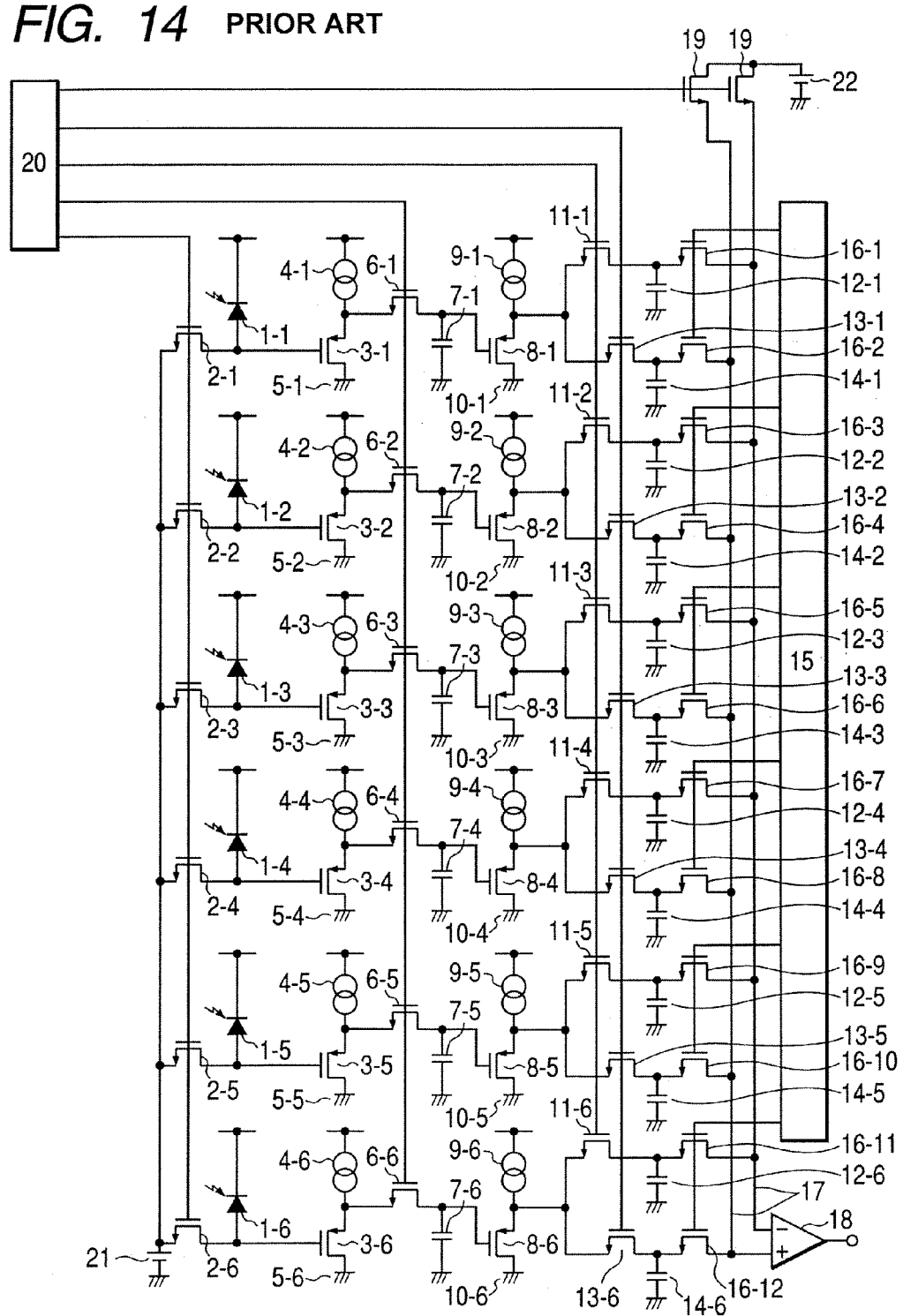
FIG. 14 is a schematic diagram showing a conventional photoelectric conversion apparatus.
Figure 15:
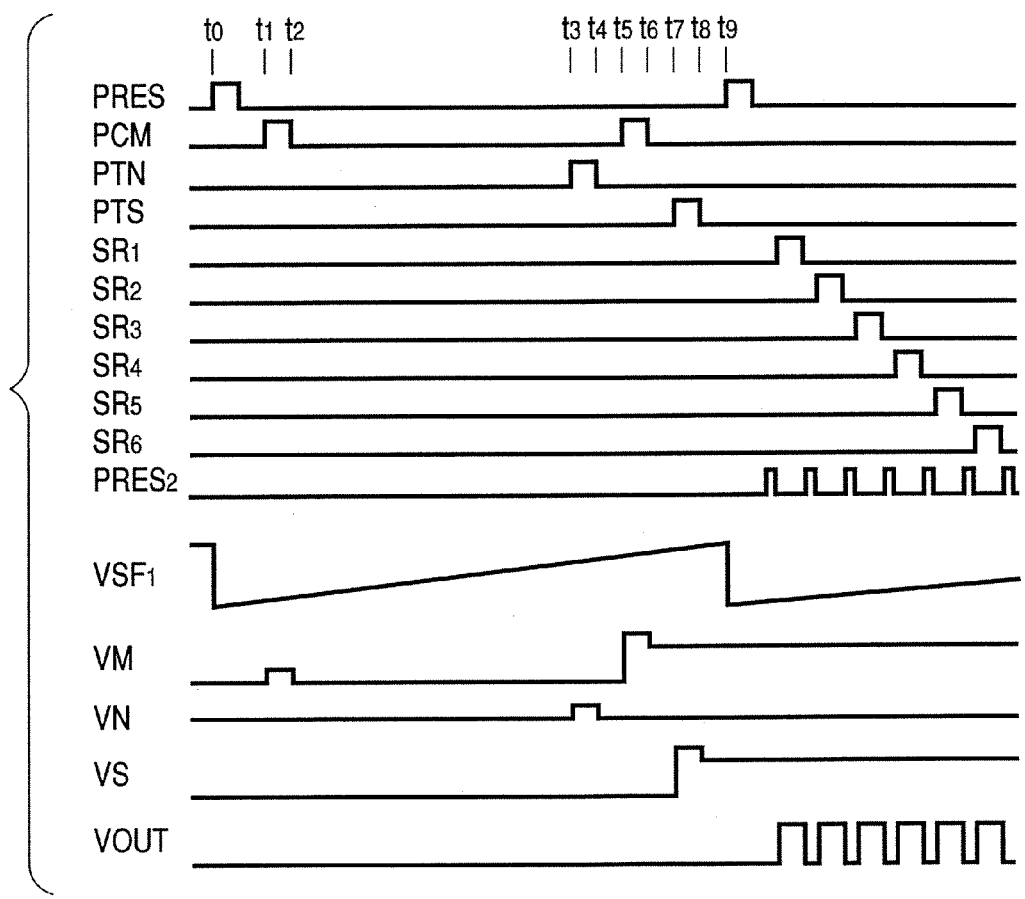
FIG. 15 shows an operational timing of a circuit of the conventional photoelectric conversion apparatus.

In FIG. 1, the same members as those in FIG. 14 are denoted by like reference symbols. The photoelectric conversion apparatus of this embodiment is the same as a conventional one in that first transfer MOS transistors 6 are sequentially connected to a single control line, but is different therefrom in that the first transfer MOS transistors 6 are wired with not a given wiring extending from a logic circuit 20 on one side but the given wiring and an additional wiring 501 on both sides.

As shown in FIG. 1, although the additional wiring 501 involves a resistance component of the wiring itself on its path, there is no gate capacitance component of the MOS transistor involved in the original control line. Thus, a control signal can be transmitted up to a position where the wiring is connected to a first transfer MOS transistor 6-6 of FIG. 1 with an extremely small RC time constant. This makes it possible to minimize an RC time constant change of the control line in pixels connected to a photoelectric conversion element 1-6 that was most influenced by the RC time constant change of the control line in a conventional example. FIG. 18C schematically shows an improvement effect according to the present invention. As shown in FIG. 18C, the wirings are connected to the first transfer MOS transistors 6 from both sides to thereby overcome a problem that a signal of a negative value is output from fourth to sixth pixels of a photoelectric conversion apparatus 401-1, and eliminate an output difference between the photoelectric conversion apparatuses which has been perceived as a serious problem particularly in the case of using the contact-type image sensor.

Figure 2:
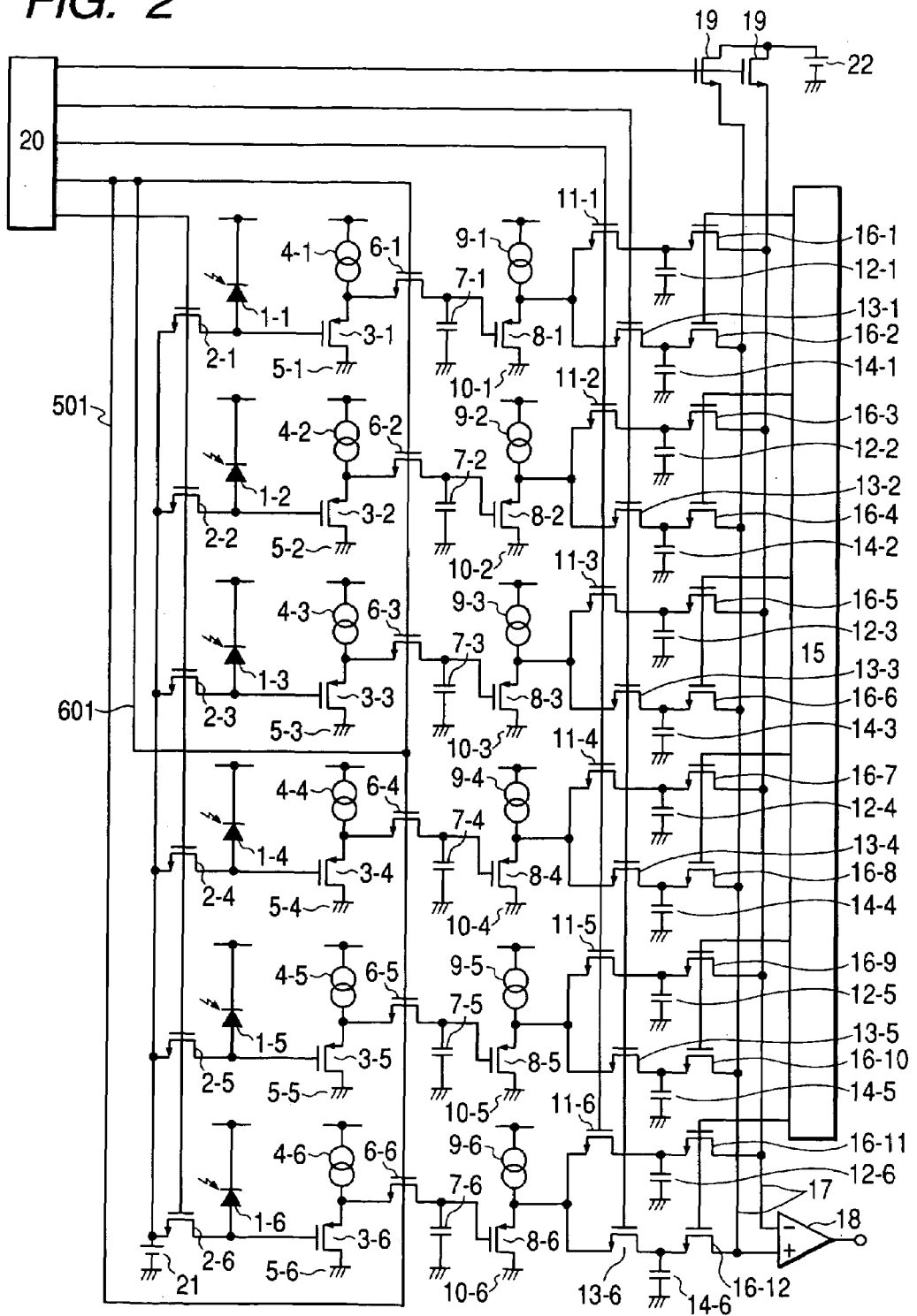
FIG. 2 shows another example of the first embodiment of the present invention.

FIG. 2 shows another example of this embodiment.

As shown in FIG. 2, the number of nodes is not limited to two on both sides, and the given wiring may be connected with another wiring as denoted by 601 in FIG. 2 somewhere in between the first transfer MOS transistors 6. In such a way, the wirings are connected together at three or more nodes in total, whereby a more beneficial effect can be produced.

Second Embodiment

Figure 3:
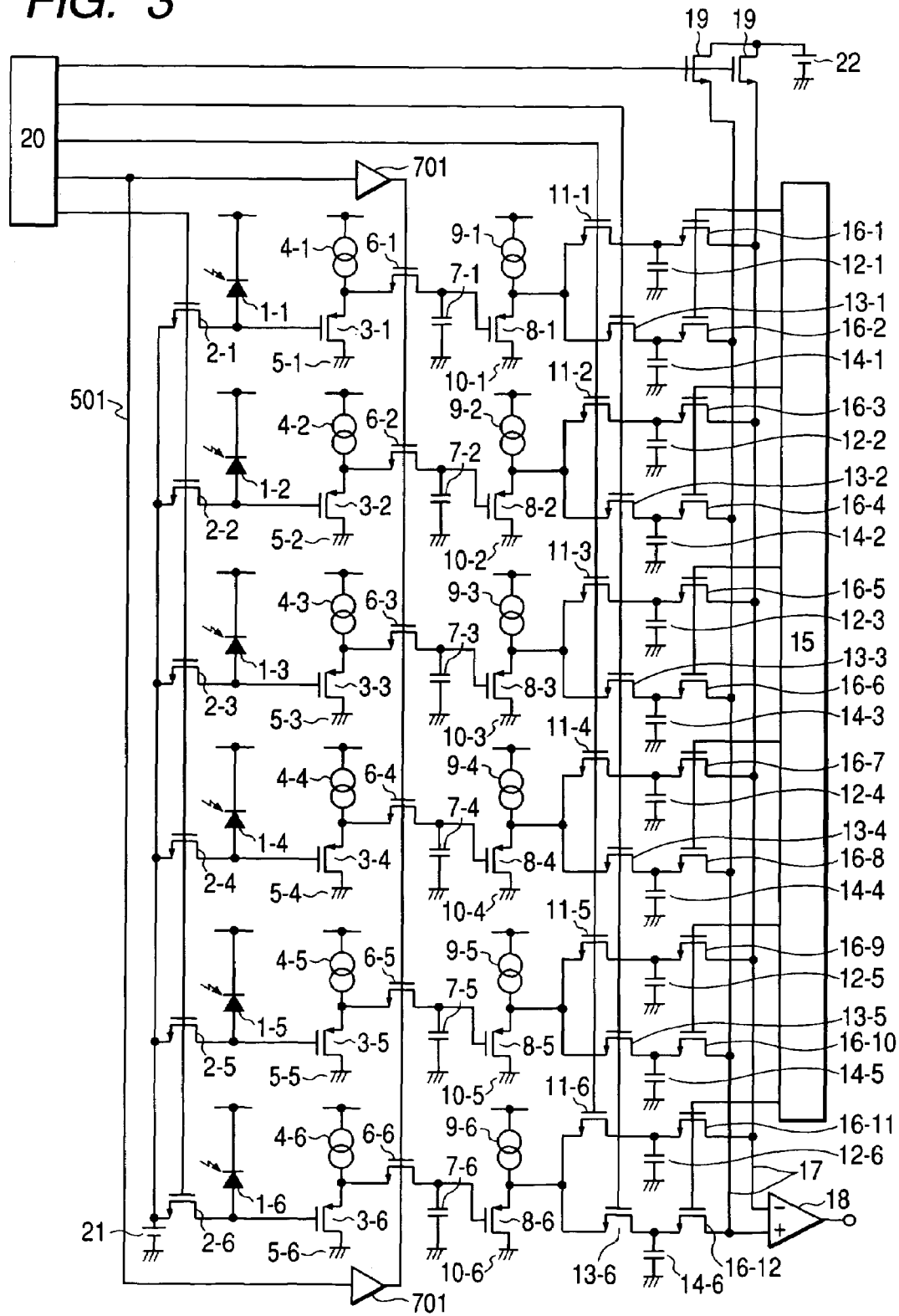
FIG. 3 is a schematic diagram showing a photoelectric conversion apparatus according to a second embodiment of the present invention.

FIG. 3 is a schematic diagram showing a photoelectric conversion apparatus according to a second embodiment of the present invention.

In FIG. 3, the same members as those in FIG. 14 are denoted by like reference symbols. The photoelectric conversion apparatus of this embodiment is the same as the first embodiment in that the first transfer MOS transistors 6 are wired with not a given wiring extending from the logic circuit 20 on one side but the given wiring and the additional wiring 501 on both sides, but is different therefrom in that the control signal is subjected to waveform shaping in a buffer circuit 701 immediately before being input to the first transfer MOS transistors 6 at the time of connecting therebetween.

With this configuration, it is possible to further reduce an influence of an RC time constant change slightly involved in the additional wiring (control line) 501, resulting in a larger improvement effect.

Figure 4:
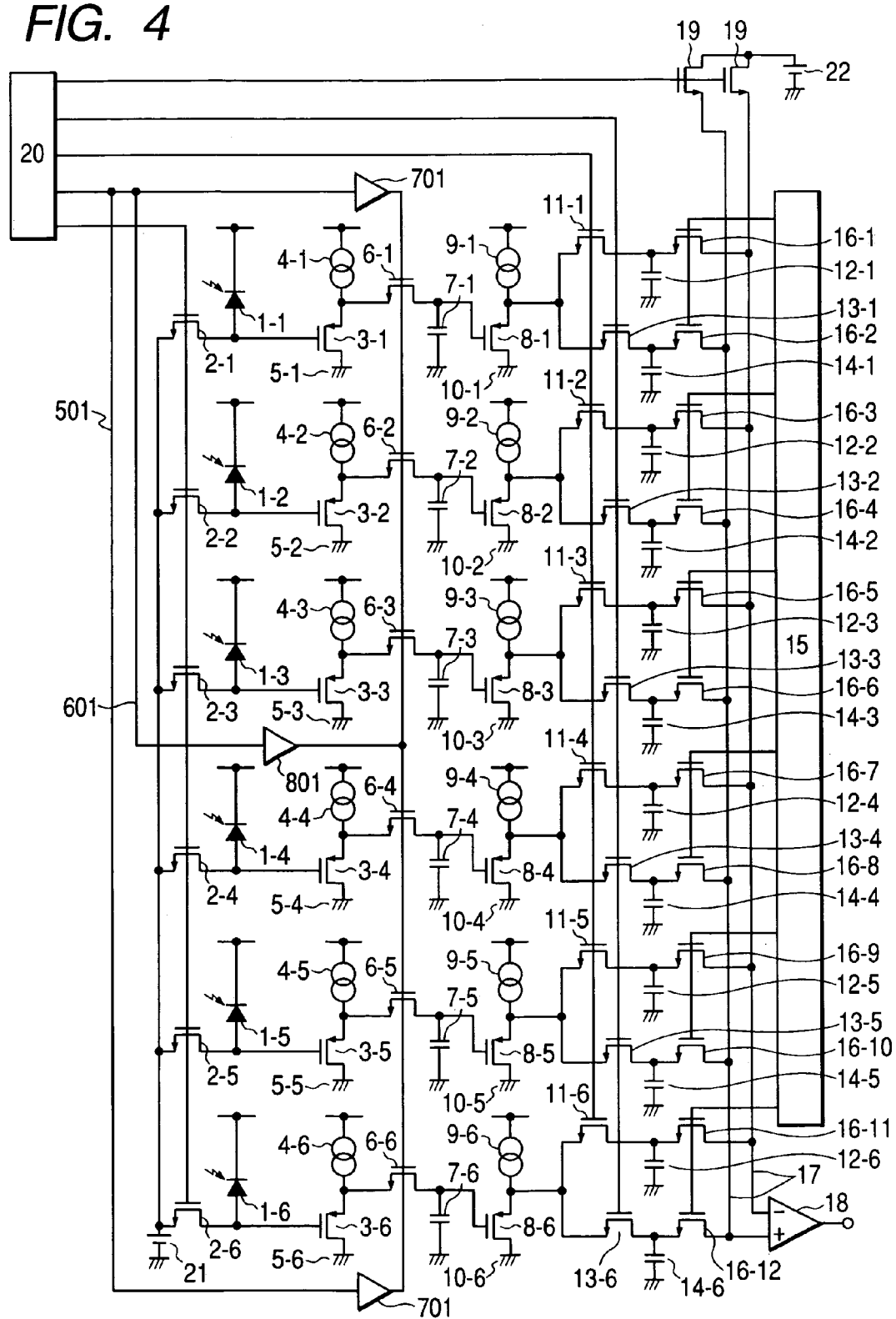
FIG. 4 shows another example of the second embodiment of the present invention.

FIG. 4 shows another example of this embodiment.

As shown in FIG. 4, the number of positions is not limited to two on both sides, and another buffer circuit as denoted by 801 in FIG. 4 may be arranged on the control line 601. In such a way, the wirings are connected together by arranging buffer circuits at three or more positions in total, whereby a more beneficial effect can be produced.

It is needless to say that the same effect can be attained even when buffer circuits are provided for each pixel.

Third Embodiment

Figure 5:
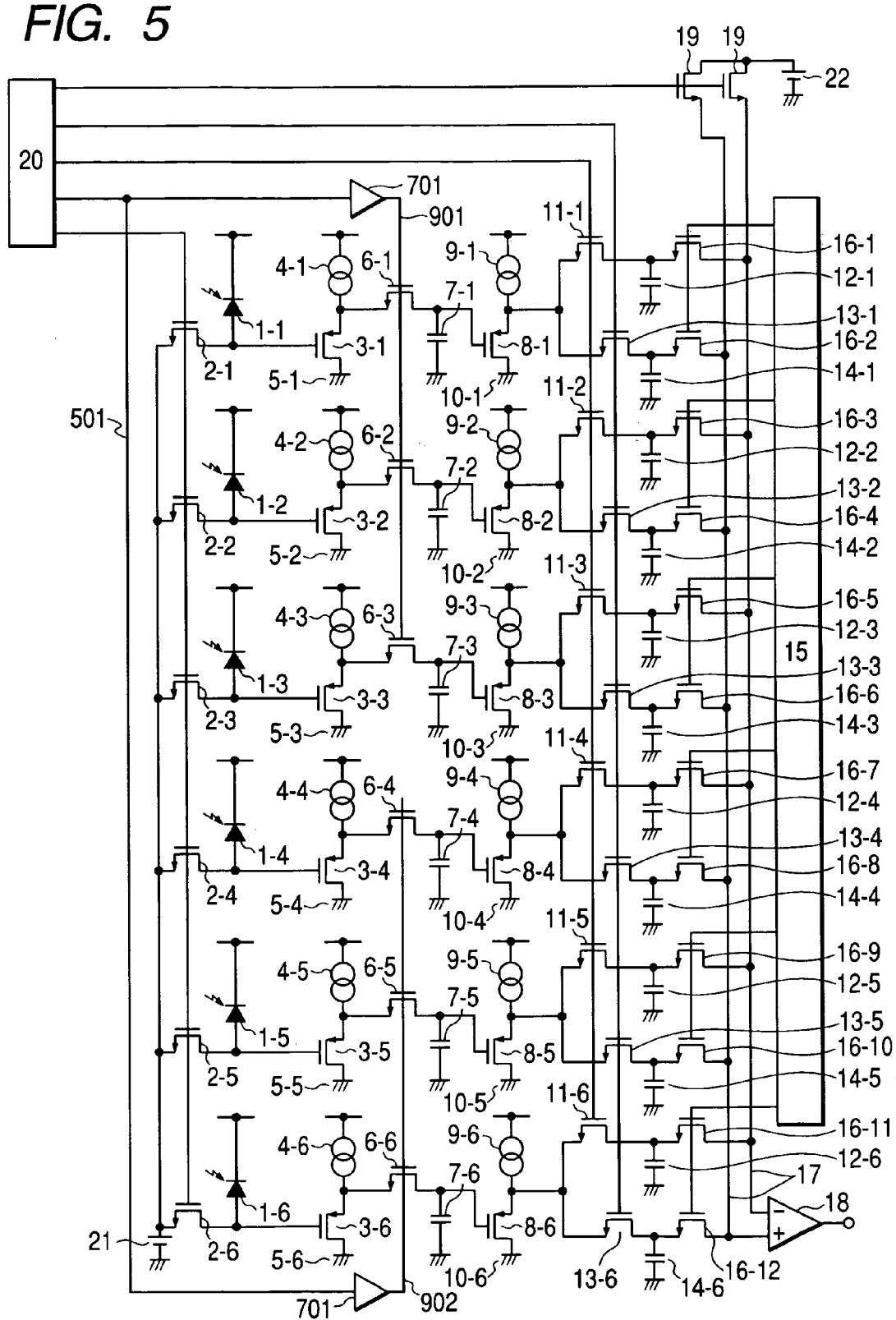
FIG. 5 is a schematic diagram showing a photoelectric conversion apparatus according to a third embodiment of the present invention.

FIG. 5 is a schematic diagram showing a photoelectric conversion apparatus according to a third embodiment of the present invention.

In FIG. 5, the same members as those in FIG. 14 are denoted by like reference symbols. In this embodiment, the first transfer MOS transistors 6 are wired with not a given wiring extending from the logic circuit 20 on one side but the given wiring and the additional wiring 501 on both sides. In addition, the control line connected to the first transfer MOS transistors 6 is divided into a control line 901 connected with preceding pixels (one group) and a control line 902 connected with succeeding pixels (the other group) somewhere in the path connecting between the first transfer MOS transistors 6.

The divided control lines 901 and 902 have terminal ends adjacent to each other on one sides opposite to sides connected to the logic circuit 20 in each group of the first transfer MOS transistors 6.

Further, although not shown, the divided control lines are connected with the logic circuit 20 from the first transfer MOS transistor 6 at the head of the one group thereof and the last one of the other group thereof.

According to the present invention, even if the photoelectric conversion elements 1-1 to 1-3 of FIG. 5 are irradiated with light, and the RC time constant of the control line 901 is changed due to the aforementioned mechanism, for example, the pixels connected to the control line 902 are completely free of its influence. Besides, assuming that the photoelectric conversion elements 1-1 to 1-4 are irradiated with light, for example, the conventional one has been influenced by a capacitance change of four pixels, while the apparatus of this embodiment is only influenced by that of one pixel, thereby minimizing the influence of the RC time constant change and significantly improving the image quality.

In this embodiment, the description has been given of the circuit with a buffer 701 by way of example, but the present invention is not limited thereto. A sufficient effect can be obtained by selecting an appropriate constant even in combination with the first embodiment.

Further, this embodiment has been directed to the case in which the transistor is wired on both sides and the wiring connected to the first transfer MOS transistors is divided into two, but the present invention is not limited thereto. The wiring may be divided into three or more depending on the RC time constant of the wiring. Furthermore, the wiring does not need to be divided evenly and may be divided as appropriate with no particular limitation.

Fourth Embodiment

Figure 6:
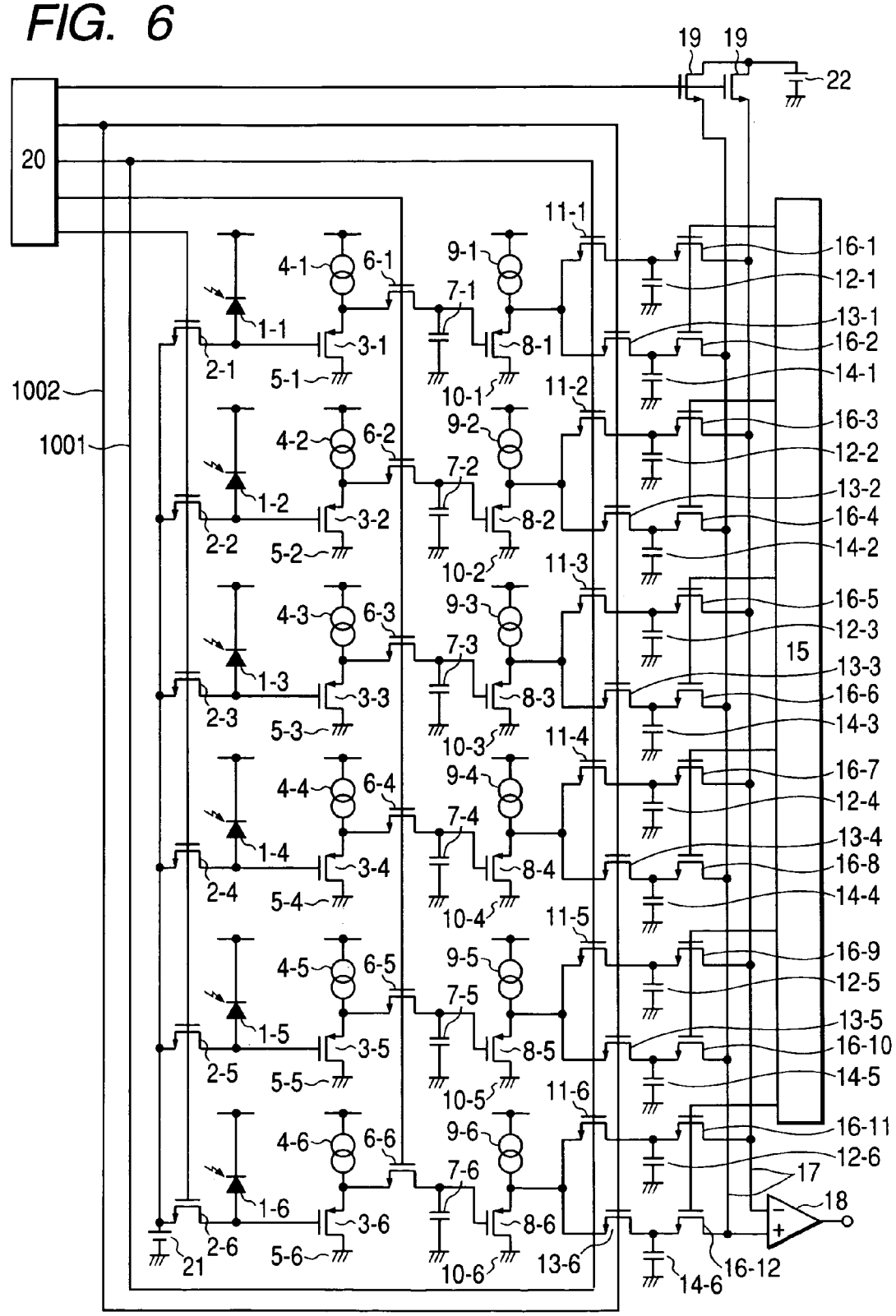
FIG. 6 is a schematic diagram showing a photoelectric conversion apparatus according to a fourth embodiment of the present invention.

FIG. 6 is a schematic diagram showing a photoelectric conversion apparatus according to a fourth embodiment of the present invention.

In FIG. 6, the same members as those in FIG. 14 are denoted by like reference numerals. In this embodiment, the present invention is applied to second transfer MOS transistors 11 and third transfer MOS transistors 13. As mentioned above, the reset voltage and the signal voltage are written and held in second storage capacitors 12 and third storage capacitors 14 through the second transfer MOS transistors 11 and the third transfer MOS transistors 13, respectively.

As regards the second transfer MOS transistors 11 and the third transfer MOS transistors 13 as well, the held potential is similarly changed due to a change of the RC time constant of the control line. However, as shown in FIG. 6, the second transfer MOS transistors 11 and the third transfer MOS transistors 13 are wired with not a given wiring extending from the logic circuit 20 on one sides but the given wiring and additional wirings 1001 and 1002 on both sides, which makes it possible to sufficiently reduce the aforementioned potential change.

Further, the first to third embodiments of the present invention are applied depending on the number of pixels and signal amplitude, whereby the photoelectric conversion apparatus that affords a higher image quality can be realized.

Fifth Embodiment

Figure 7:
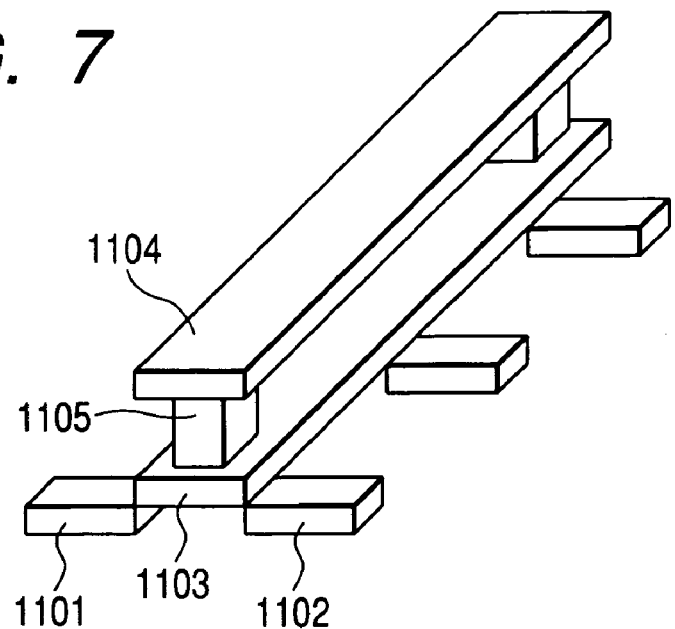
FIG. 7 is a schematic diagram showing a structure of switch means according to a fifth embodiment of the present invention.

FIG. 7 is a schematic diagram showing a structure of switch means according to a fifth embodiment of the present invention.

In FIG. 7, reference numeral 1101 denotes a source of a transfer MOS transistor; 1102, a drain of the transfer MOS transistor; and 1103, a gate of the transfer MOS transistor. The gate 1103 doubles as a first wiring layer and connects between the transfer MOS transistors. Polysilicon or silicide is used for the gate 1103. Reference numeral 1104 denotes a second wiring layer. The wiring layer 1104 is formed of Al or Cu. Denoted by 1105 is a via hole through which the first wiring layer 1103 and the second wiring layer 1104 are connected together.

In FIG. 7, the three transfer MOS transistors are arranged. In the meantime, the second wiring layer 1104 is connected at both ends, that is, in two positions. To that end, the gate capacitance of the intermediate transfer MOS transistor is not involved in the second wiring layer 1104, which minimizes the RC time constant in the second wiring layer 1104. Accordingly, the control lines of the transfer MOS transistors are arranged as in this embodiment, whereby the potential change of the storage capacitor can be sufficiently reduced.

Figure 8:
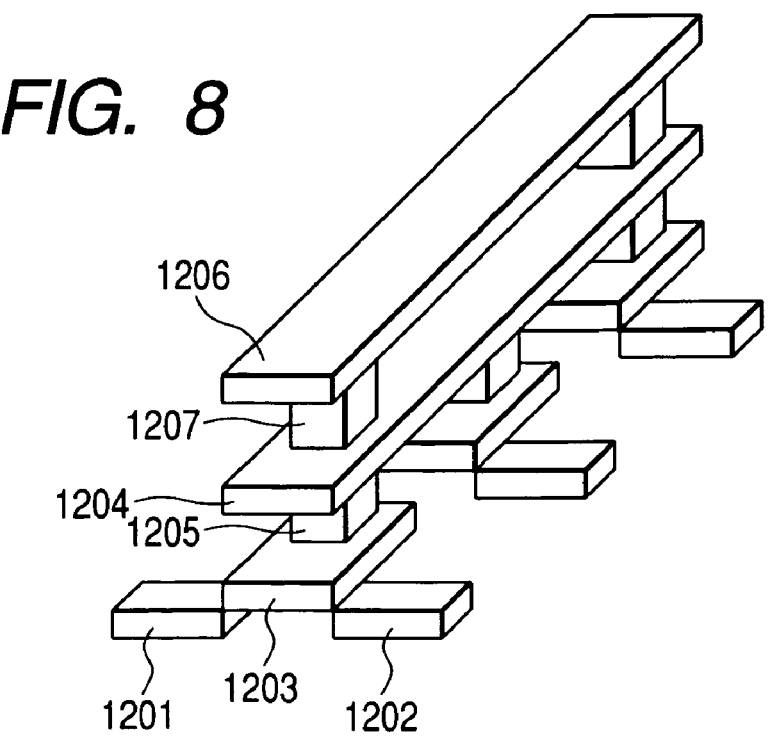
FIG. 8 shows another example of the fifth embodiment of the present invention.

FIG. 8 shows another example of this embodiment.

In FIG. 8, reference numeral 1201 denotes a source of a transfer MOS transistor; 1202, a drain of the transfer MOS transistor; and 1203, a gate of the transfer MOS transistor. Polysilicon or silicide is used for the gate 1203. Reference numeral 1204 denotes a first wiring layer; 1205, a via hole through which the gate 1203 and the first wiring layer 1204 are connected together; 1206, a second wiring layer; and 1207, a second via hole through which the first wiring layer 1204 and the second wiring layer 1206 are connected together. The first wiring layer 1204 and the second wiring layer 1206 are made of Al or Cu. This configuration tan, needless to say, produce the same effect.

Sixth Embodiment

Figure 9:
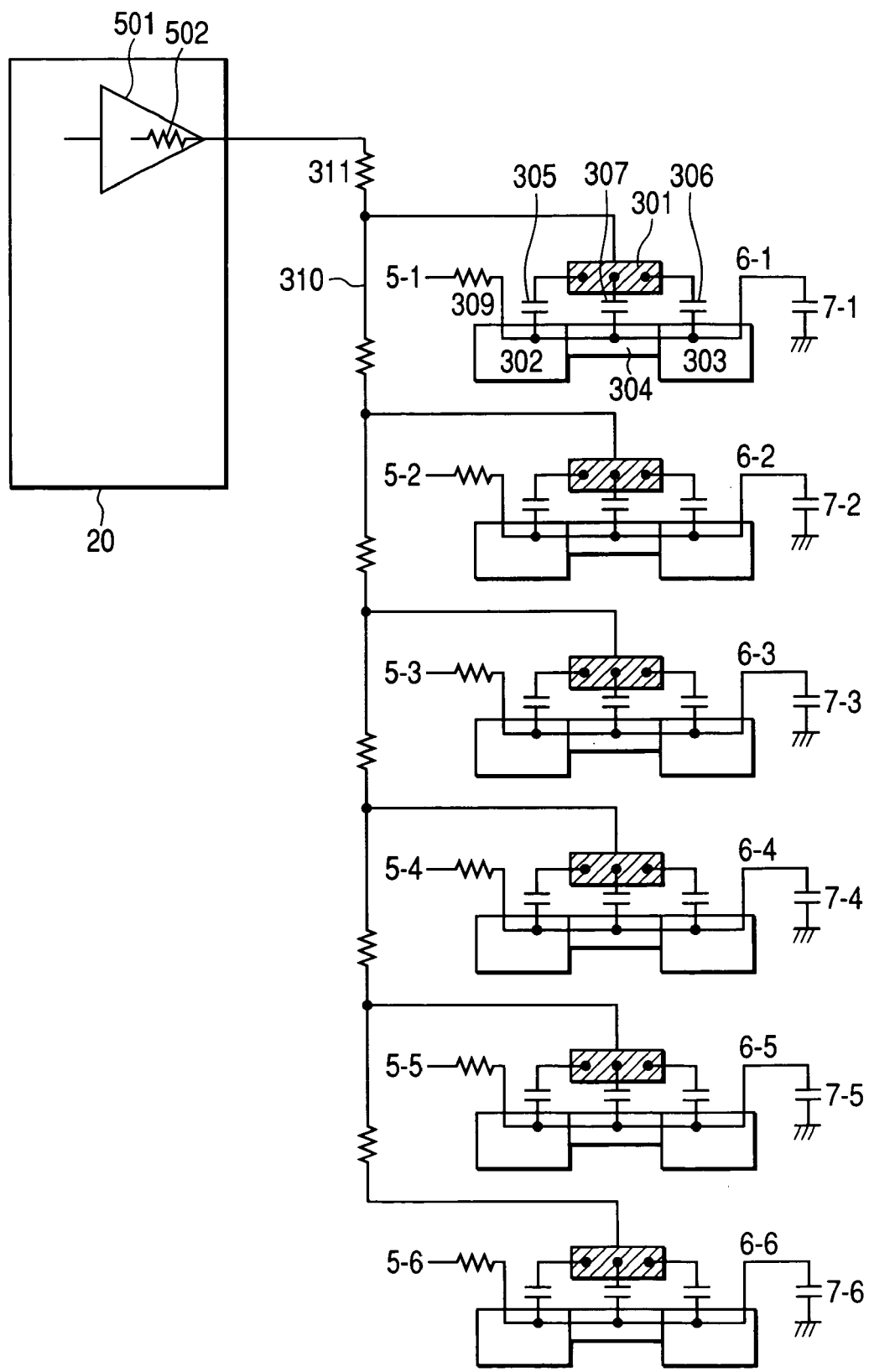
FIG. 9 is a schematic diagram showing a photoelectric conversion apparatus according to a sixth embodiment of the present invention.

FIG. 9 is a schematic diagram showing a sixth embodiment of the present invention.

Figure 16C:
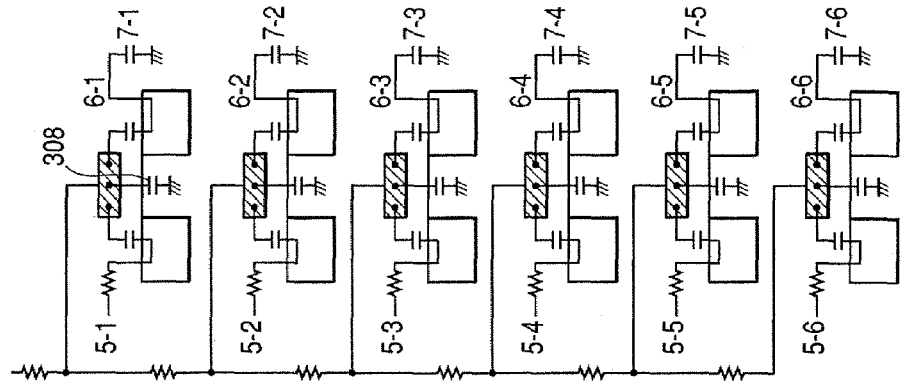
FIGS. 16A, 16B and 16C schematically show the peripheral of a first transfer MOS transistor 6 of FIG. 14.
Figure 16B:
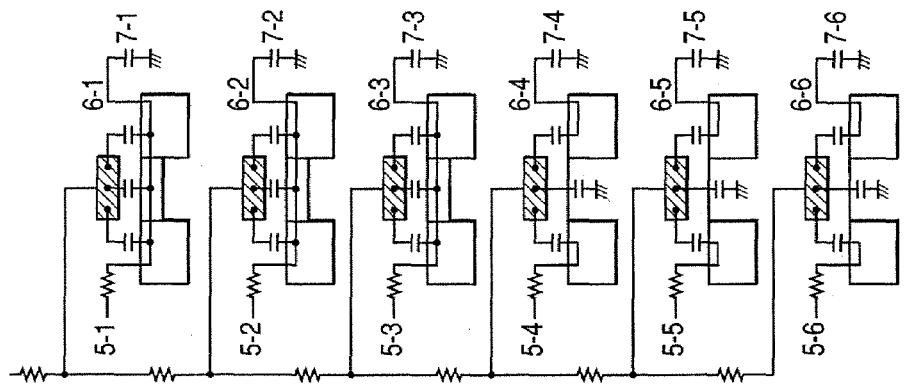
Figure 16A:
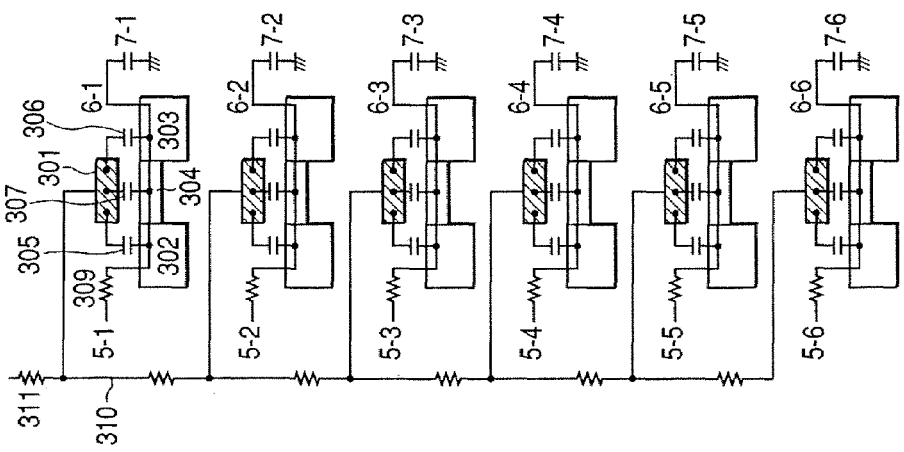
Figure 17A:
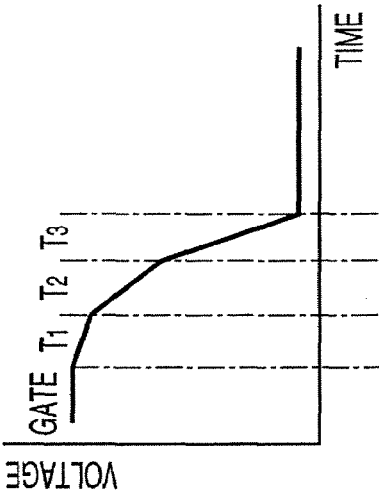
FIGS. 17A, 17B, 17C and 17D are detailed charts showing an operational timing at time $t_2$.
Figure 17B:
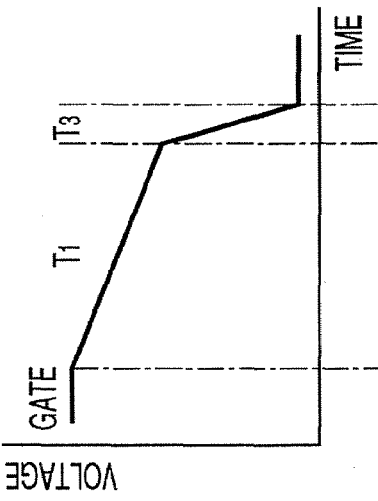
Figure 17C:
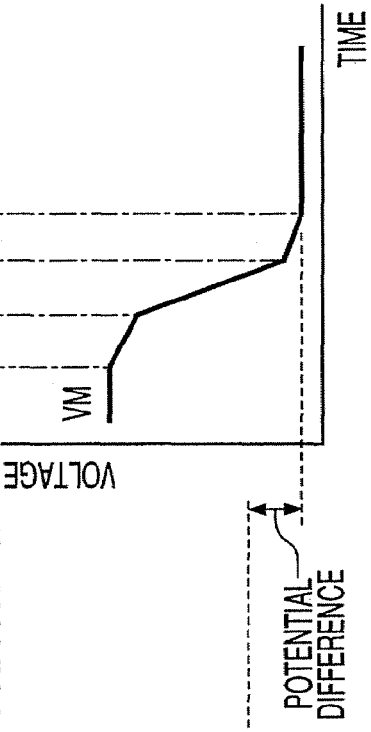
Figure 17D:
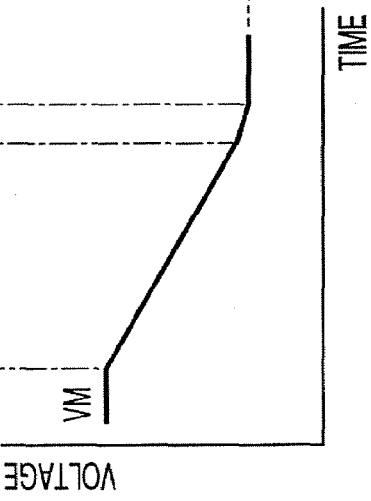

In FIG. 9, the same members as those of FIGS. 16A to 16C are denoted by like reference numerals. Reference numeral 501 denotes the buffer arranged inside the logic circuit 20 and composed of, for example, a CMOS inverter. Denoted by 502 is an output resistor of the buffer, which is schematically shown herein. For example, when the CMOS inverter composes the buffer 501, an on-resistance of the MOS transistor as a component becomes a main output resistance component of the buffer. According to the present invention, an RC time constant resulting from the output resistor 502 of the buffer 501 outputting the control signal for the first transfer MOS transistors 6, and the capacitance involved in the control line 310 is set larger than that resulting from the resistance component 309 and each first storage capacitor 7.

As mentioned above, if the resistance between each storage capacitor 7 and each source follower 5 is sufficiently low, the voltage across each storage capacitor 7 must be fixed to the output voltage of the source follower. In practice, however, the resistance component 309 is added, so the potential of the storage capacitor is transiently changed according to a potential change of the control line. Resetting the transiently changed voltage to the original voltage determined by the source follower requires a time corresponding to the RC time constant resulting from the resistance component 309 and the storage capacitor 7. According to the present invention, the RC time constant of the control line is set larger than the above level, whereby it is possible to ensure a time necessary for resetting the voltage to a voltage to be originally read even if the potential of the storage capacitor temporarily changes.

According to the present invention, it is possible to solve a problem that the signals of a negative value in the pixels of the photoelectric conversion apparatuses 5-4 to 5-6 are output, and eliminate an output difference between the photoelectric conversion apparatuses, which has been perceived as a serious problem particularly in the case of using the contact-type image sensor.

Seventh Embodiment

Figure 10:
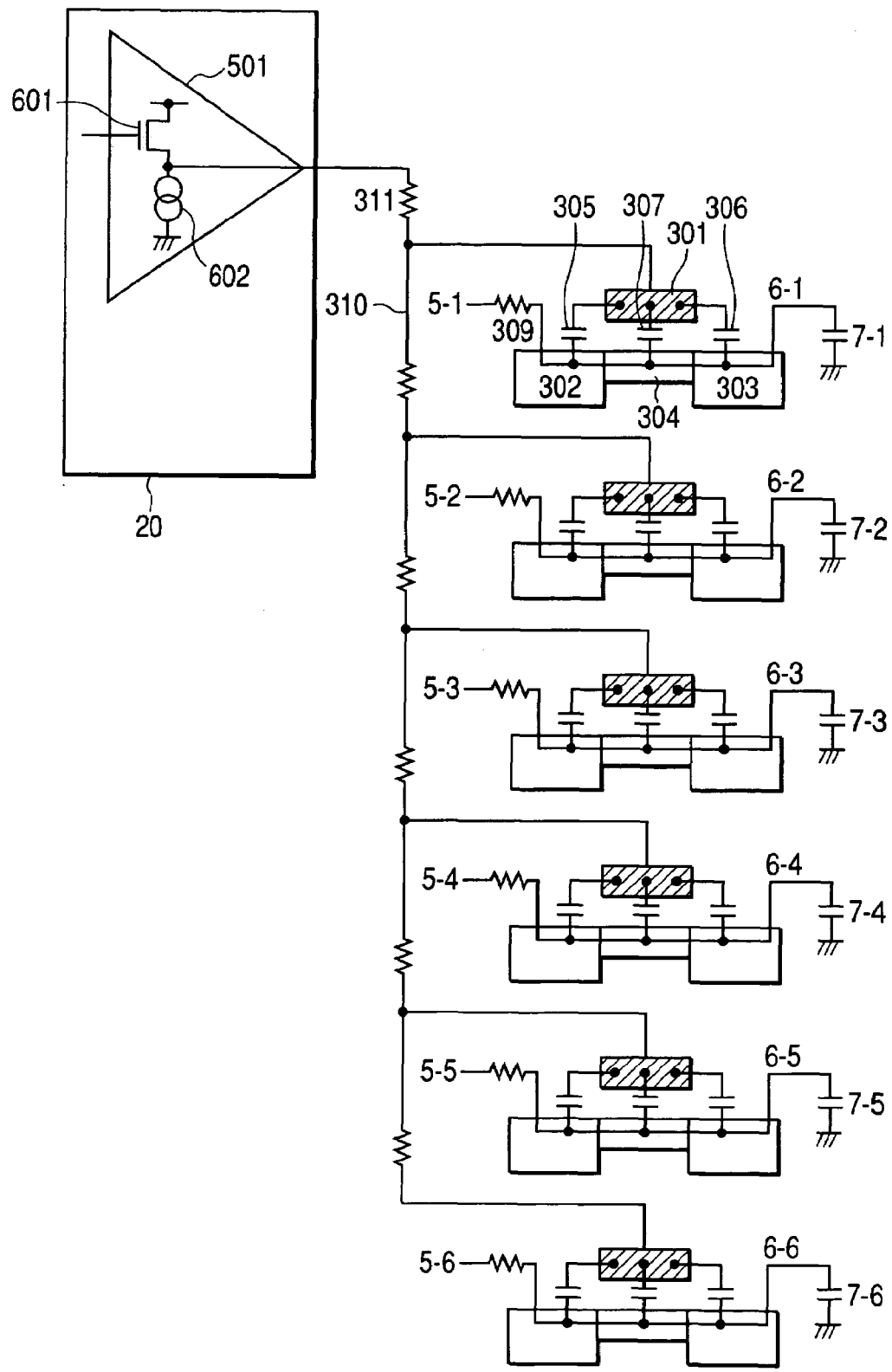
FIG. 10 is a schematic diagram showing a photoelectric conversion apparatus according to a seventh embodiment of the present invention.

FIG. 10 is a schematic diagram showing a seventh embodiment of the present invention.

In FIG. 10, the same members as those of FIGS. 16A to 16C and FIG. 9 are denoted by like reference symbols. The present invention applies a ramp waveform to a change from an on-state to an off-state of a control signal. In FIG. 10, reference numeral 601 denotes a PMOS transistor; and 602, a constant current source. The PMOS transistor 601 and the constant current source 602 constitute the buffer 501. When the gate voltage of the PMOS transistor 601 is at a low level, the PMOS is turned on, whereby the output level of the buffer 501 becomes high. When the gate voltage of the PMOS transistor 601 is set to a high level, the PMOS transistor is turned off. The output of the buffer 501 involves the capacitance through the control line 310, so it is necessary to reset charges of the capacitor through the constant current source 602 to make the output level of the buffer 501 low.

Provided that I represents current that can be supplied from the constant current source, and C represents the capacitance, the output potential of the buffer 501 is changed with a ramp waveform whose pattern is represented by following expression:

$$\Delta V/\Delta t = I/C.$$

The ramp waveform is controlled relative to the RC time constant determined by the resistance component 309 and the storage capacitor 7, whereby the same effect as that in the first embodiment is attained.

In this embodiment, the case of generating the ramp waveform using the current flowing through the constant current source and the capacitance involved in the control line has been described by way of example. However, the present invention is not limited thereto. For example, even if the ramp waveform is generated using an operational amplifier or a D/A converter, the same effect can be attained. Also, this embodiment has been described by taking as an example a case where the control signal is changed from the high level to the low level with the ramp waveform, but the present invention is not limited thereto. The same effect can be attained even with the use of a structure in which the signal is changed inversely in accordance with the polarity of the transfer MOS transistor controlled by use of the control signal.

Eighth Embodiment

In FIG. 14, a period necessary for resetting the potential of the storage capacitor 7 corresponds to a larger one of an RC time constant determined by the on-resistance of the first transfer MOS transistors 6 and the storage capacitor 7 and a time constant determined by the current I supplied from the constant current source 4 and the value of the storage capacitor 7.

If the RC time constant is dominant over the time constant, the on-resistance of the first transfer MOS transistor 6 is lowered such that it becomes smaller than the RC time constant involved in the control line. Hence, the time necessary for resetting the voltage to a voltage to be originally read can be ensured even if the potential of the storage capacitor is temporarily changed.

Besides, if the time constant determine by the current supplied from the constant current source 4 is dominant over the RC time constant, the current is increased such that it becomes smaller than the RC time constant involved in the control line. As a result, the time necessary for resetting the voltage to a voltage to be originally read can be ensured even if the potential of the storage capacitor is temporarily changed as well. It is possible to solve a problem that the signals of a negative value in the pixels of the photoelectric conversion apparatuses 5-4 to 5-6 are output, and eliminate an output difference between the photoelectric conversion apparatuses, which has been perceived as a serious problem particularly in the case of using the contact-type image sensor.

Ninth Embodiment

Figure 11:
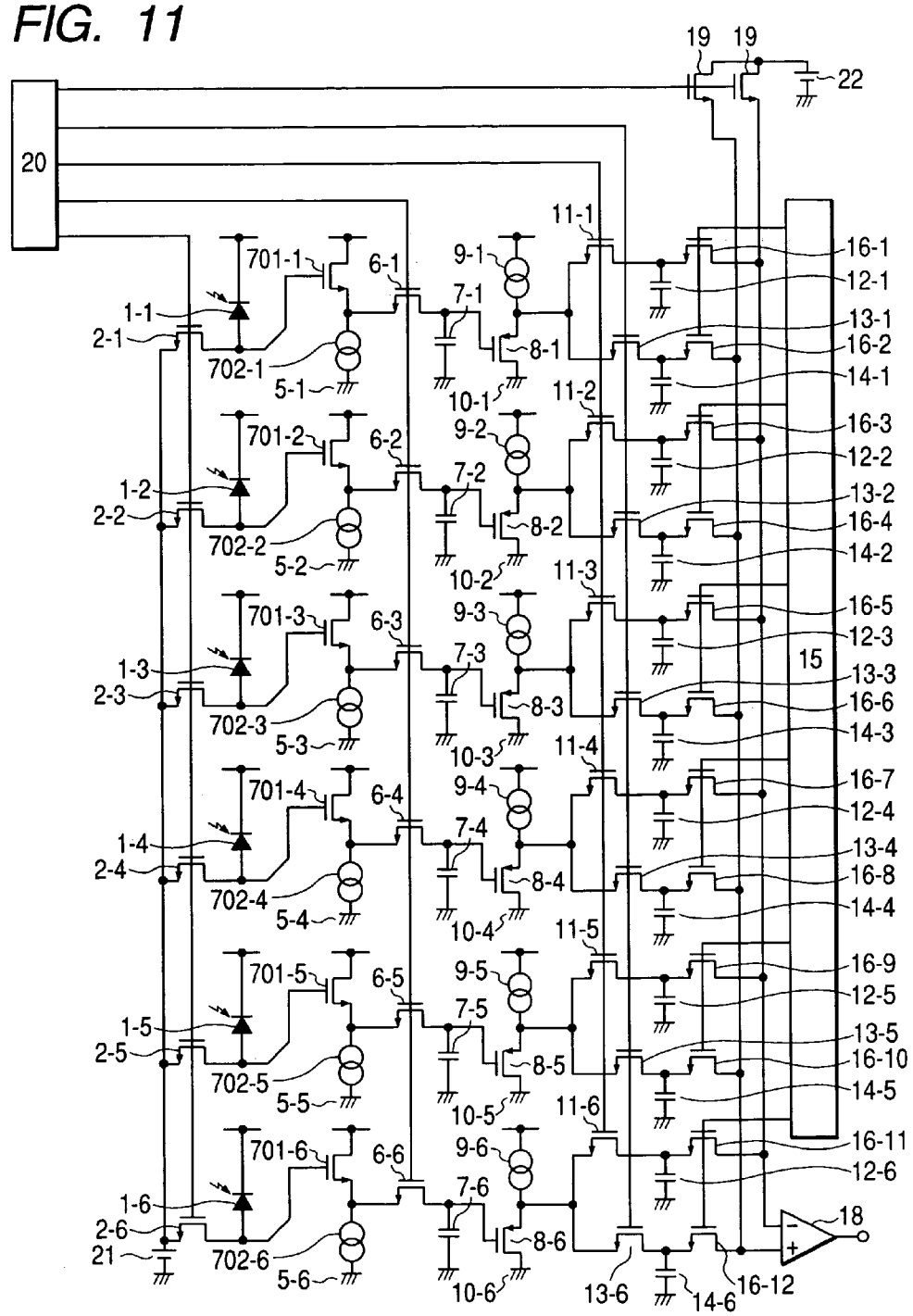
FIG. 11 is a schematic diagram showing a photoelectric conversion apparatus according to a ninth embodiment of the present invention.

FIG. 11 is a schematic diagram showing a ninth embodiment of the present invention.

In FIG. 11, the same members as those of FIG. 14 are denoted by like reference symbols. Reference numeral 701 denotes an input MOS transistor of a first source follower; and 702, a constant current source of the first source follower (note that the input MOS transistors are assigned with sub-numbers like 701-1, 701-2, . . . for each pixel; the same applies to the constant current sources 702). The input MOS transistor 701 and the constant current source 702 constitute the first source follower 5 together.

This embodiment is an example of the source follower configured by an NMOS transistor. Using the constant current source for the source follower allows the gain to approximate 1. Hence, the high-sensitivity photoelectric conversion apparatus can be attained, but a problem arises in that a size of an element composing the constant current source becomes large when the time constant determined by the current supplied from the constant current source is dominant as described in the eighth embodiment.

As in the present invention, by adopting the source follower using an NMOS transistor for the first transfer MOS transistor 6 that is an NMOS transistor, when the control signal is shifted to an off-state to transiently change the potential of the storage capacitor 7 to a lower level, a larger bias is applied between the gate and source of the input NMOS transistor 701. As a result, the on-resistance of the input NMOS transistor 701 is lowered, whereby the potential of the storage capacitor 7 can be promptly set.

Tenth Embodiment

The description of the above embodiments has been focused on the first transfer MOS transistor 6, but the present invention is not limited thereto. The present invention is effectively applicable to the second transfer MOS transistor 11 and the third transfer MOS transistor 13. As mentioned above, the reset voltage and the signal voltage are written and held in the second storage capacitors 12 and the third storage capacitors 14 through the second transfer MOS transistors 11 and the third transfer MOS transistors 13, respectively. As regards the second transfer MOS transistors 11 and the third transfer MOS transistors 13 as well, the held potential is similarly changed due to a change of the RC time constant of the control line, but the use of the structures of the sixth to ninth embodiments can sufficiently reduce the potential change.

Eleventh Embodiment

This embodiment is directed to an example of applying the photoelectric conversion apparatus of the present invention to a contact-type image sensor of an original image recording apparatus.

Figure 12:
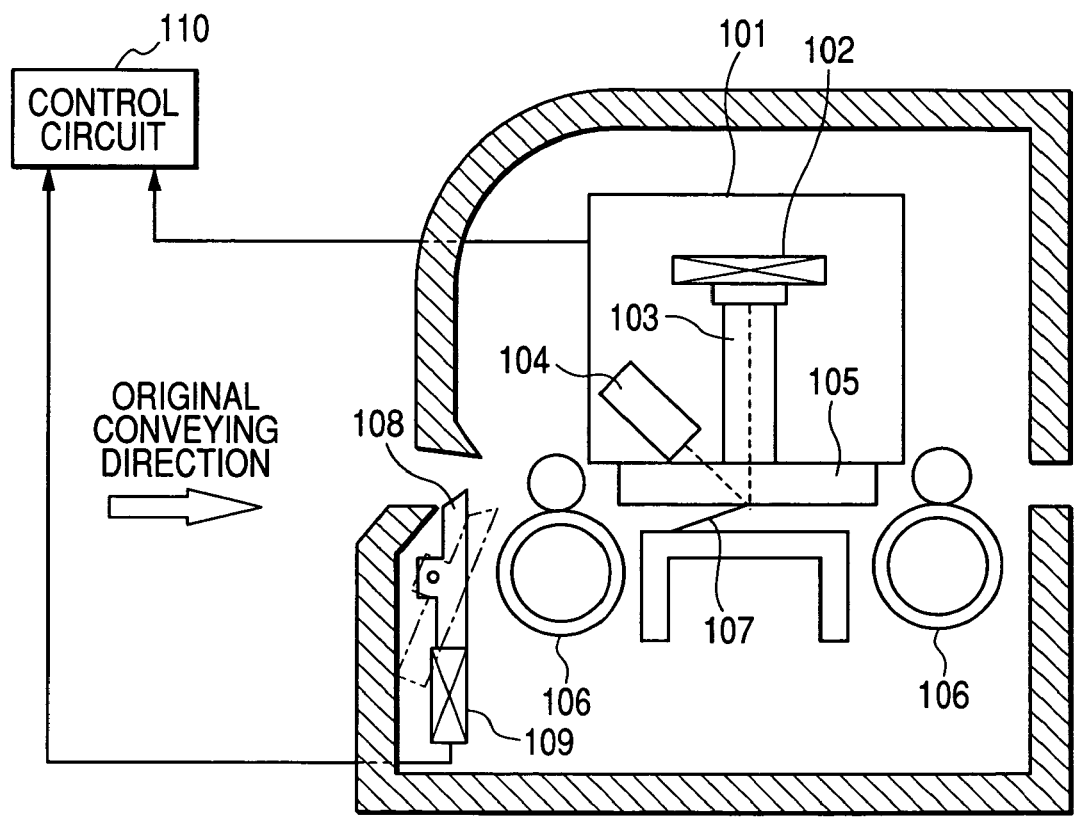
FIG. 12 schematically shows an original image reading apparatus for reading an original image according to an eleventh embodiment of the present invention.
Figure 13:
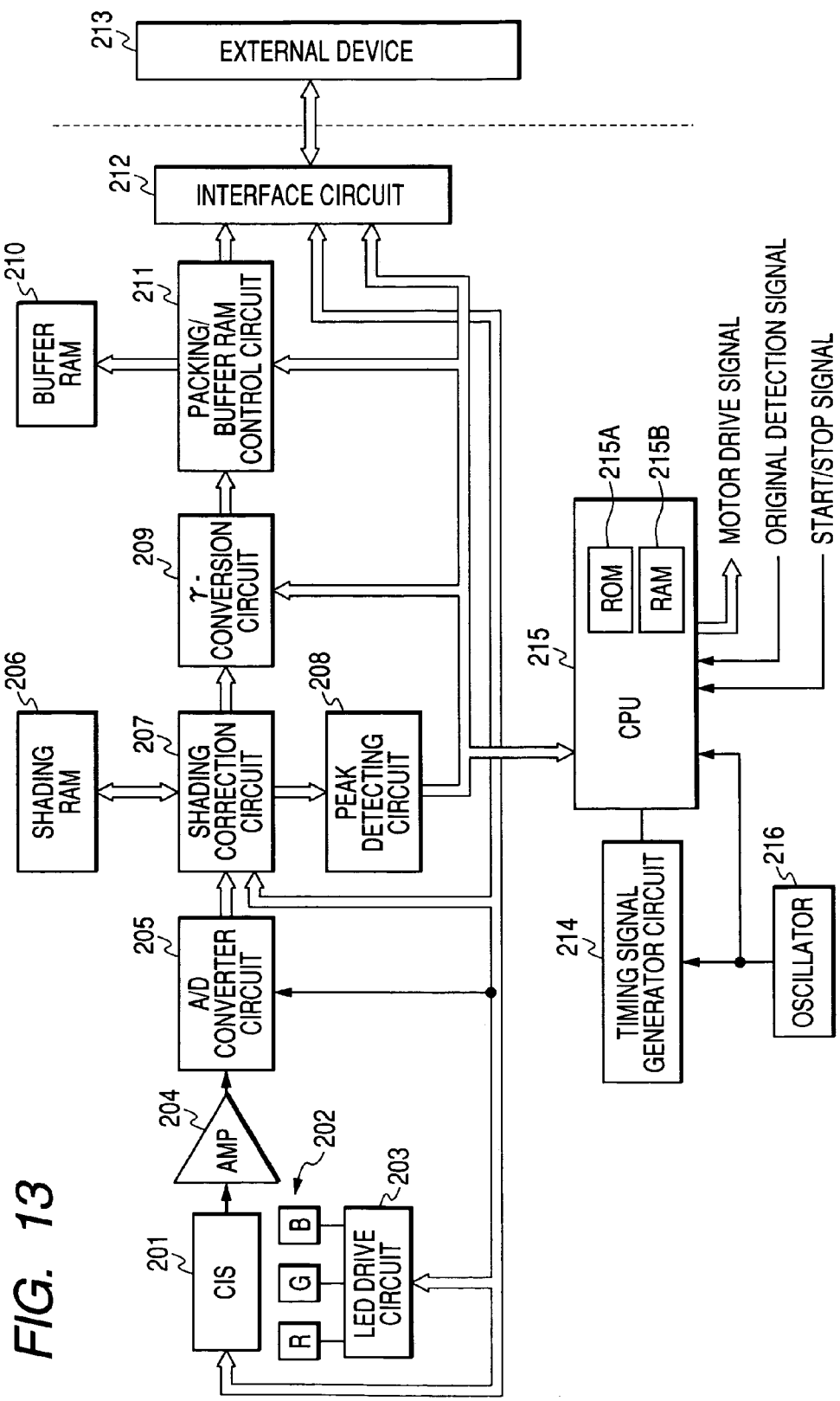
FIG. 13 is a block diagram showing an electric structure for detailing a control circuit 110 of FIG. 12.

Referring to FIGS. 12 and 13, detailed description will be given of an embodiment where the photoelectric conversion apparatus of the present invention is applied to a contact-type image sensor of a sheet-feed type original image reading apparatus.

FIG. 12 is a schematic diagram showing an original image reading apparatus for reading an original image.

FIG. 13 is a block diagram showing an electric configuration for detailing a control circuit 110 of FIG. 12.

A contact-type image sensor (hereinafter also referred to as "CIS") 101 is composed of a photoelectric conversion apparatus 102, a SELFOC (registered trademark) lens 103, an LED array 104, and a contact glass 105.

Transport rollers 106 are arranged upstream and downstream of the CIS 101 and used for transporting an original. A contact sheet 107 is used for bringing the original into contact with the CIS 101. The control circuit 110 processes signals from the CIS 101.

An original detecting lever 108 is adapted to detect an inserted original. When detecting the inserted original, the original detecting lever 108 inclines to change an output from an original detecting sensor 109, thereby transmitting the changed output to a CPU 215 in the control circuit 110. The CPU 215 then judges that the original has been inserted to drive a motor (not shown) for driving the original transport rollers 106 and start transporting the original to read an original image.

Hereinafter, the circuit operation will be described with reference to FIG. 13.

In FIG. 13, a contact-type image sensor 201 (CIS 101 of FIG. 12) is integrated with an LED 202 of respective colors of R, G, and B as a light source, and switchingly turns the LED 202 of the respective colors of R, G, and B for each line by an LED control (drive) circuit 203 while transporting the original on the contact glass 105 of the CIS 101, making it possible to read color images in respective colors of R, G, and B in a line sequential manner.

An AMP 204 is an amplifier for amplifying a signal output from the CIS 201. Denoted by 205 is an A/D converter for performing an A/D conversion on the output signal thus amplified to obtain an 8-bit output digital signal, for example. A shading RAM 206 stores data for shading correction by previously reading a calibration sheet. A shading correction circuit 207 performs shading correction on an image signal read on the basis of the data stored in the shading RAM 206. A peak detecting circuit 208 detects a peak value in the read image data on a line basis and is used for detecting a leading edge of the original. A γ-conversion circuit 209 performs γ-conversion on the read image data according to a γ-curve preset by a host computer.

A buffer RAM 210 temporarily stores image data for synchronizing actual reading operations and communications with the host computer. A packing buffer RAM control circuit 211 performs packing processing according to an image output mode (binary, 4-bit multilevel, 8-bit multilevel, and 24-bit multilevel) preset by the host computer, and then writes the resultant data in the buffer RAM 210, reads the image data from the buffer RAM 210, and outputs the image data to an interface circuit 212.

The interface circuit 212 receives a control signal from an external device as a host device of the image reading apparatus according to this embodiment such as a personal computer and outputs an image signal thereto.

Reference numeral 215 denotes the CPU in the form of a microcomputer, which has a ROM 215A storing a procedure and an operational RAM 215B and controls each part in accordance with the procedure stored in the ROM 215A.

Reference numeral 216 denotes an oscillator such as a crystal oscillator; and 214, a timing signal generator circuit for dividing an output of the oscillator 216 in accordance with settings of the CPU 215 and generating various timing signals as a reference of an operation. Denoted by 213 is an external device connected with a control circuit through the interface circuit 212. The external device is, for example, a personal computer.

Given above is the explanation of the first to eleventh embodiments.

The photoelectric conversion apparatus of the present invention is, needless to say, effectively applicable to not only a hole storage type photoelectric conversion element but also an electron storage type one.

Also, the present invention is, needless to say, effectively applicable to not only a source follower using the PMOS transistor but also a source follower using the NMOS transistor and an inverting amplifier thereof.

Also, the present invention is, needless to say, effectively applicable to not only the transfer MOS transistor composed of the NMOS transistor but also the transfer MOS transistor composed of the PMOS transistor.

When the above structures are combined when in use, the signal flow direction and the direction in which the potential changes at the time of turning the transfer MOS transistor off are changed, but the present invention is effective for every combination.

Also, in the first to fifth, eighth, and ninth embodiments, the description has been made of the case of generating the control signal for switching on/off the transfer MOS transistor in the logic circuit 20, but the present invention is not limited thereto. For example, even if the control signals are supplied directly to a pad of the photoelectric conversion apparatus from the outside, the present invention is, needless to say, effectively applied.

Further, the present invention is not limited to the one-dimensional photoelectric conversion apparatus where pixels are arranged in line as mentioned above, but is, needless to say, effectively applicable to a two-dimensional photoelectric conversion apparatus where pixels are arranged in multiple lines.

This application claims priority from Japanese Patent Application No. 2004-078469 filed Mar. 18, 2004 and Japanese Patent Application No. 2004-078470 filed March 18 which are hereby incorporated by reference herein.

What is claimed is:

1. A photoelectric conversion apparatus comprising:
   a plurality of photoelectric conversion elements;
   a plurality of amplifying means for amplifying a signal in accordance with a photo-carrier generated in the photoelectric conversion elements;
   a plurality of signal holding means for holding output signals from the amplifying means respectively through switch means;
   common output line for outputting the signal held by the plurality of signal holding means; and
   control signal supplying means for supplying a control signal to the switch means through a control line,
   wherein the control line is connected to the plurality of switch means and has both ends connected to the control signal supplying means.

2. A photoelectric conversion apparatus comprising:
   a plurality of photoelectric conversion elements;
   a plurality of amplifying means for amplifying a signal in accordance with a photo-carrier generated in the photoelectric conversion elements;
   a plurality of signal holding means for holding output signals from the amplifying means respectively through switch means;

common output line for outputting the signal held by the plurality of signal holding means; and control signal supplying means for supplying a control signal to the switch means through a control line, wherein the control line is connected to the plurality of switch means and is connected to the control signal supplying means at its both ends and at least one position between the plurality of switch means.

3. A photoelectric conversion apparatus comprising:

a plurality of photoelectric conversion elements;

a plurality of amplifying means for amplifying a signal in accordance with a photo-carrier generated in the photoelectric conversion elements;

a plurality of signal holding means for holding output signals from the amplifying means respectively through switch means;

common output line for outputting the signal held by the plurality of signal holding means; and control signal supplying means for supplying a control signal to the switch means through a control line, wherein the control line is divided in accordance with the plurality of switch means that are divided into at least two groups, and connected to the plurality of switch means in each group, and the divided control lines are connected to the same control signal supplying means.

4. A photoelectric conversion apparatus according to any one of claims 1 to 3, wherein the plurality of switch means are arranged in line.

5. A photoelectric conversion apparatus according to claim 3, wherein the divided control lines have terminal ends adjacent to each other on an opposite side to a side connected to the control signal supplying means in each group of the plurality of switch means.

6. A photoelectric conversion apparatus according to claim 3, wherein the divided control lines are connected to the control signal supplying means at both from switch means at the head of one group of the plurality of switch means, and from last switch means in another group thereof.

7. A photoelectric conversion apparatus according to claim 4, wherein the divided control lines are connected to the control signal supplying means at both from switch means at the head of one group of the plurality of switch means, and from last switch means in another group thereof.

8. A photoelectric conversion apparatus according to any one of claims 1 to 3, wherein the control line is provided with control signal buffer means.

9. A photoelectric conversion apparatus according to any one of claims 1 to 3, further comprising reset means for resetting the photoelectric conversion elements, wherein the plurality of signal holding means include common signal holding means for holding a signal corresponding to the photoelectric conversion element reset by the reset means and a signal in accordance with a photo-carrier at different times.

10. A photoelectric conversion apparatus according to claims 1 to 3, further comprising reset means for resetting the photoelectric conversion elements, wherein the plurality of signal means include different signal holding means for respectively holding a signal corresponding to the photoelectric conversion element reset by the reset means and a signal in accordance with a photo-carrier.

11. A photoelectric conversion apparatus according to any one of claims 1 to 3, wherein the switch means is MOS transistor.

12. A contact-type image sensor comprising a plurality of photoelectric conversion apparatuses according to any one of claims 1 to 3 mounted thereto.

13. An original image reading apparatus, comprising the contact-type image sensor according to claim 11.

* * * * *